(12) United States Patent  
Iwamura

(10) Patent No.: US 8,294,638 B2
(45) Date of Patent: *Oct. 23, 2012

(54) POWER SAVING DISPLAY MODE FOR ORGANIC ELECTROLUMINESCENT DISPLAYS

(75) Inventor: Ryuichi Iwamura, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 994 days.

This patent is subject to a terminal disclaimer.

(21) Appl. No.: 11/942,643

(22) Filed: Nov. 19, 2007

(65) Prior Publication Data

US 2008/0133949 A1  Jun. 5, 2008

Related U.S. Application Data

(63) Continuation of application No. 10/723,803, filed on Nov. 25, 2003, now Pat. No. 7,312,771.

(51) Int. Cl.
*G09G 3/30* (2006.01)
(52) U.S. Cl. .......................................... 345/76; 345/211
(58) Field of Classification Search .................... 345/76, 345/77, 82–84, 211–213, 87, 88; 348/730; 713/300, 310
See application file for complete search history.

(56) References Cited

U.S. PATENT DOCUMENTS

| | | | |
|---|---|---|---|
| 6,054,981 A | 4/2000 | Kimoto et al. | |
| 6,243,082 B1 | 6/2001 | Konishi | |
| 6,507,350 B1 | 1/2003 | Wilson | |
| 7,312,771 B2* | 12/2007 | Iwamura | 345/76 |
| 2002/0097208 A1 | 7/2002 | Hashimoto | |
| 2002/0154102 A1 | 10/2002 | Huston | |
| 2002/0180723 A1 | 12/2002 | Siwinski | |
| 2002/0186214 A1 | 12/2002 | Siwinski | |
| 2003/0011696 A1 | 1/2003 | Yamazaki | |
| 2003/0107537 A1 | 6/2003 | Ochi et al. | |
| 2004/0160447 A1 | 8/2004 | Beaudoin et al. | |
| 2005/0057462 A1 | 3/2005 | Kota et al. | |
| 2005/0184943 A1 | 8/2005 | Nakajima | |
| 2006/0208982 A1 | 9/2006 | Hashimoto | |

* cited by examiner

*Primary Examiner* — Regina Liang
(74) *Attorney, Agent, or Firm* — John P. O'Banion

(57) ABSTRACT

An improved organic electroluminescent display includes a plurality of normal mode colors and a plurality of user-selected power saving mode colors. The display is switchable between a normal display mode and a power saving display mode. In the normal display mode, the normal mode colors are displayed by the display. Conversely, in the power saving display mode, the power saving mode colors are displayed by the display.

14 Claims, 4 Drawing Sheets

POWER SAVING DISPLAY MODE FOR ORGANIC ELECTROLUMINESCENT DISPLAYS

CROSS-REFERENCE TO RELATED APPLICATIONS

This application is a continuation of U.S. patent application Ser. No. 10/723,803, filed on Nov. 25, 2003, incorporated herein by reference in its entirety, which is now U.S. Pat. No. 7,312,771.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to organic electroluminescent displays, and more particularly to methods for conserving power consumed by organic electroluminescent displays.

2. Description of Related Art

Liquid crystal displays (LCDs) are widely used for portable computers and other products. One major disadvantage of an LCD is that an LCD emits no light; only the transparency of an LCD changes by adding or not adding a voltage. To obtain a high contrast, an LCD requires a backlight. Unfortunately, a backlight lamp consumes much power, e.g., more than one-half of the total power that a laptop personal computer (PC) consumes. The power consumption of the LCDs is an important matter for battery operated portable products.

Current state-of-the art displays include organic electroluminescent (OEL) displays. OEL displays are slowly being introduced into the electronics market. Unlike LCDs, each pixel on an OEL display emits light. Therefore, a backlight is not required. Further, OEL displays can be slimmer than LCDs. It is likely that in many applications LCDs will be replaced with OEL displays in the near future.

As stated above, OEL displays emit light. It happens that darker colors consume less power than brighter colors. As such, darker colors are preferable for power saving. However, white, or other brighter colors, are commonly used as background colors for windows in a PC, and these colors increase the power consumption of OEL displays. Accordingly, if brighter colors occupy most areas of the display screen, a color reverse might be good in order conserve power consumption. Microsoft Windows OS, for example, has such a color reverse feature. A user can change the display mode in a display appearance window. Unfortunately, this feature can only be applied to Windows graphic objects; that is, window background, frames, menus, etc. Many web pages use white as a background color, but this background color remains the same regardless of user Windows settings. Therefore, the Windows color reverse feature is not beneficial for power conservation. In order to maximize power conservation, all brighter colors on the display screen should be changed to darker ones.

The present invention recognizes the present drawbacks and provides a solution to one or more of the problems associated therewith.

BRIEF SUMMARY OF THE INVENTION

An aspect of the invention is to provide a self-emitting display such as an organic electroluminescent display that includes a plurality of normal mode colors and a plurality of power saving mode colors. Each power saving mode color is assigned to a normal mode color. During a power saving display mode, each normal mode color having an assigned power saving mode color is switched to the assigned power saving mode color.

In a preferred embodiment, each normal mode color not having an assigned power saving mode color is reversed during a power saving display mode. Moreover, a user can assign each power saving mode color to a normal mode color. Preferably, the display includes a power saving indicator that shows the reduction in energy consumed by the display when it is in the power saving display mode. The power saving display mode can be entered manually or automatically. In a preferred embodiment, the display is an organic electroluminescent display.

Another aspect of the invention is a method for conserving power in an organic electroluminescent display. The method includes providing a plurality of normal mode colors and providing a plurality of power saving mode colors. Each power saving mode color is assigned to a normal mode color. In a power saving display mode, each normal mode color having an assigned power saving mode color is switched to the assigned power saving mode color.

A still further aspect of the invention is an organic electroluminescent display having a plurality of normal mode colors and a plurality of power saving mode colors. In this aspect of the present invention, the display is switchable between a normal display mode, in which the normal mode colors are displayed, and a power saving display mode, in which the power saving mode colors are displayed.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Referring more specifically to the drawings, for illustrative purposes the present invention is embodied in the apparatus generally shown in FIG. 1 through FIG. 5. It will be appreciated that the apparatus may vary as to configuration and as to details of the parts, and that the method may vary as to the specific steps and sequence, without departing from the basic concepts as disclosed herein.

Figure 1:
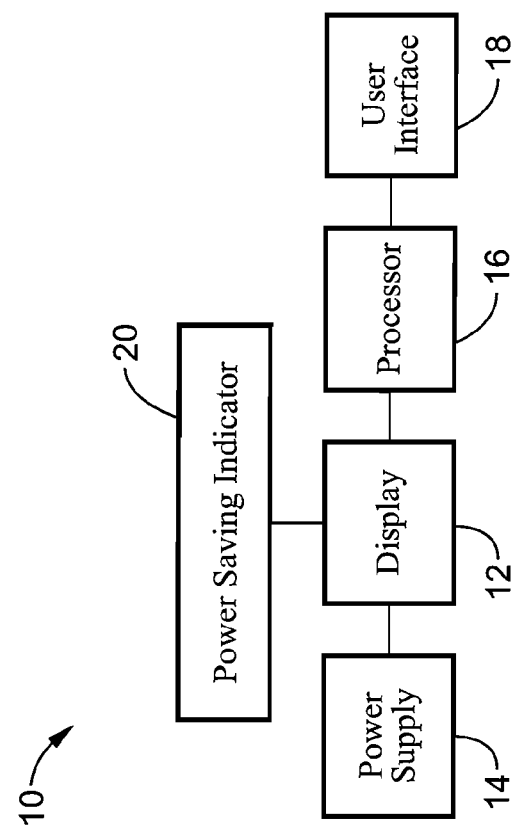
FIG. 1 is a block diagram of an organic electroluminescent display system.

Referring initially to FIG. 1, an organic electroluminescent display system is shown and is generally designated 10. As shown, the system 10 includes a display 12, such as an organic electroluminescent (OEL) display, to which a power supply 14 is connected. It can be appreciated that the power supply 14 can be an alternating current (AC) power supply or a direct current (DC) power supply. Moreover, a processor 16 is connected to the display 12. The processor 16 includes a program, described below, that can be used to conserve the power consumed by the display 12 during operation. FIG. 1 further shows a user interface 18 that is connected to the processor 16. The user interface 18 can be, for example, a keyboard, a mouse, an electric pen, etc. In lieu of a user interface 18, the display 12 can include touch screen functionality that can act as a user interface. FIG. 1 further shows that the system 10 further includes a power saving indicator 20 that can appear on the display 12 in order to show the reduction in energy consumption of the display 12 when it is in the power saving display mode, described in detail below.

It is to be understood that the processor 16 includes a program that provides a power saving display mode for the display 12. The program, described below, increases the energy efficiency of the display 12 while maintaining the clarity of the display. In other words, the easiest way to convert bright colors to dark colors is to automatically reverse the colors. However, this results in a bizarre display scheme, i.e., it looks like a photo negative, that is difficult to see. Additionally, the background color can be user selected and it may be darker in normal mode. Thus, when reversed, the background color is going to be brighter. The program according to the present invention allows a user to freely assign a power saving display mode color to each normal mode color and when the power saving display mode is executed each normal mode color is changed to its corresponding power saving display mode color.

Figure 2:
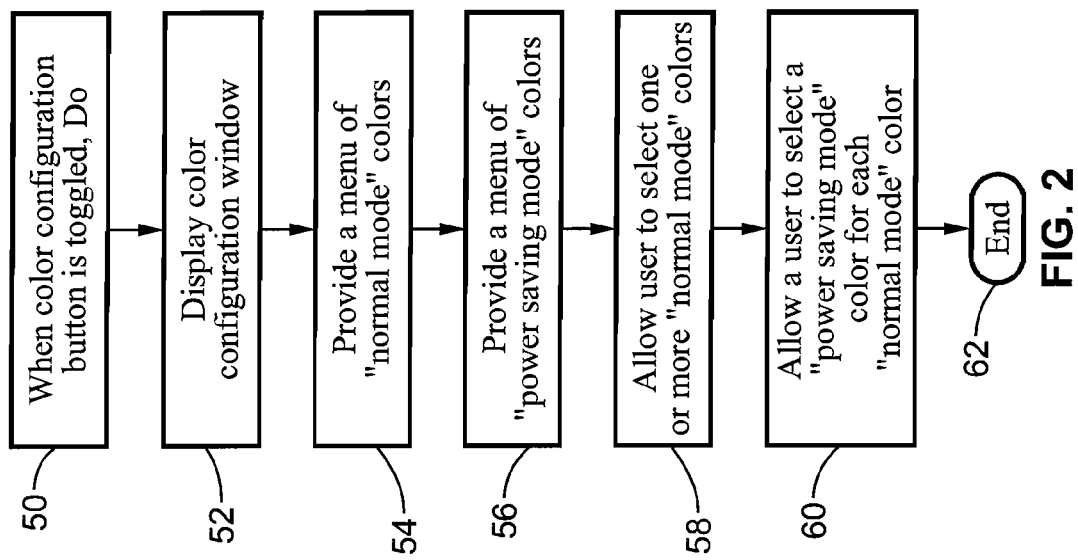
FIG. 2 is a flow chart of the configuration logic according to the present invention.

Referring now to FIG. 2, configuration logic according to the present invention is shown and commences at block 50 with a do loop, wherein when a button, e.g., a color configuration button, is toggled, the following steps are performed. At block 52, a color configuration window is displayed. Thereafter, at block 54, a menu of normal mode colors is provided, e.g., within the color configuration window. Moving to block 56, a menu of power saving mode colors is also provided, e.g., within the color configuration window. Proceeding to block 58, a user is allowed to select one or more normal mode colors for each element displayed on the display 12 (FIG. 1). At block 60, a user is allowed to select a power saving mode color for each normal mode color. The logic then ends at state 62.

Figure 3:
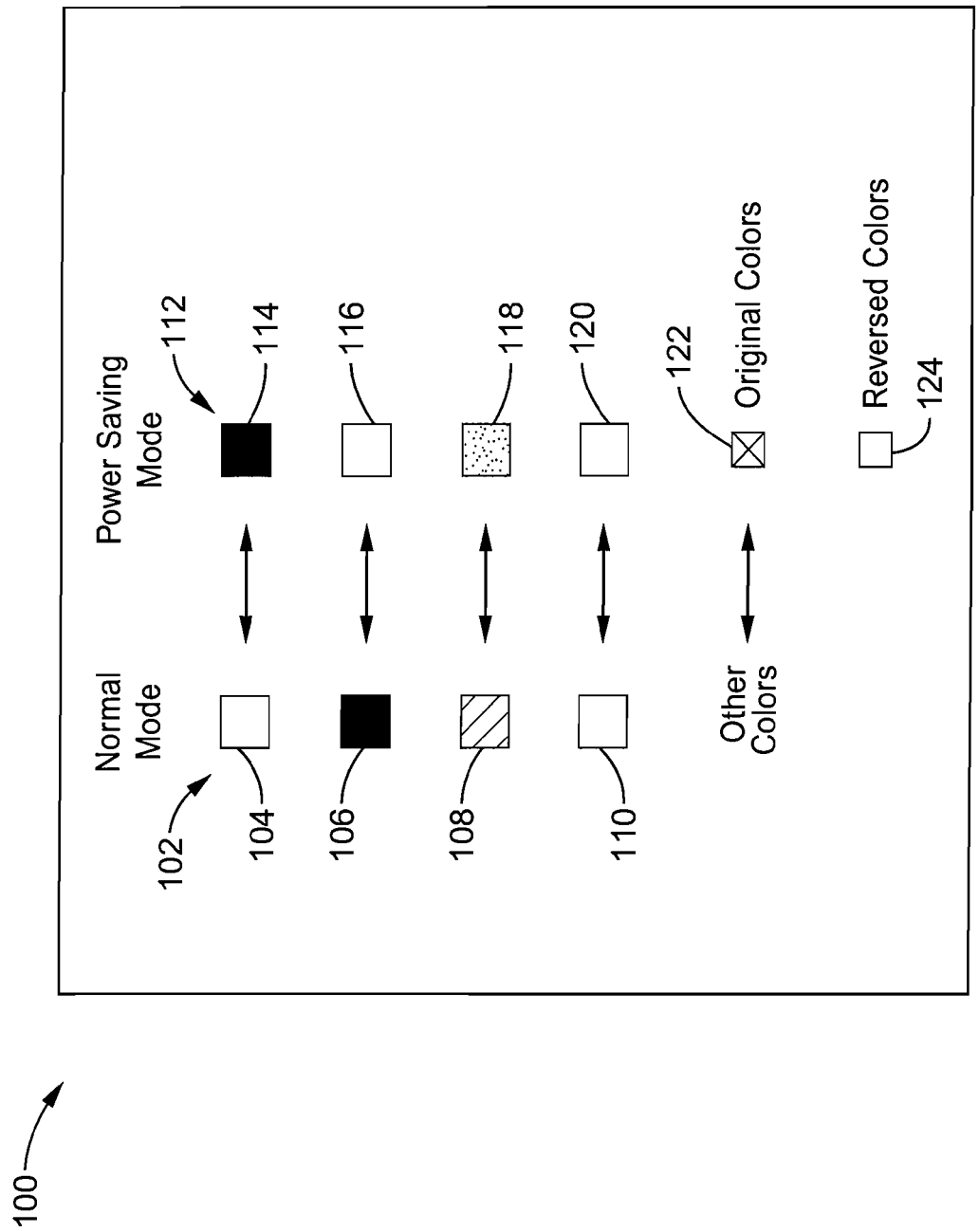
FIG. 3 is a view of a color configuration window according to the present invention.

FIG. 3 shows a non-limiting, exemplary embodiment of a color configuration window, generally designated 100. As shown, the color configuration window 100 includes a normal mode column 102 that includes a first color indication square 104, a second color indication square 106, a third color indication square 108, and a fourth color indication square 110. The color configuration window 112 also includes a power saving mode column 112 that includes a first color indication square 114, a second color indication square 116, a third color indication square 118, and a fourth color indication square 120.

It is to be understood that in a non-limiting, exemplary embodiment, user can select a normal mode color for a particular element displayed on the display 12 (FIG. 1) by using the user interface 18, e.g., a mouse, to move a cursor to a particular color area or color element on the display 12. Then, the user can drag-and-drop that particular color area or color element into a color indication square 104, 106, 108, 110 in the normal mode column 102, e.g., the first color indication square 104. After that, the user can toggle or otherwise click on the corresponding first color indication square 114 in the power saving mode column 112 to open a color selection window, e.g., the color selection window shown described below in conjunction with FIG. 4. Using the color selection window, the user can select a power saving mode color for the corresponding normal mode color shown in the first color indication square 104. Similarly, the user can drag-and-drop other colors into the second and third color indication squares 106, 108 in the normal mode column 102 and choose corresponding power saving mode colors for each normal mode color via the color selection window.

It can be appreciated that more than four color indication squares 104, 106, 108, 110 can be included in the normal mode column 102 and as such, the power saving mode column 112 can include more than four color indication squares 114, 116, 118, 120. Moreover, it can be appreciated that the color configuration window 100 can include names of particular graphic objects, e.g., desktop, scrollbar, background, etc., adjacent to corresponding color indication squares 104, 106, 108, 110 in the normal mode column 102. In such an embodiment, a user does not have to drag-and-drop each object color—he or she can simply select a normal mode color and a power saving mode color for each graphic object listed in the color configuration window 100.

Further, it is to be understood that the fourth color indication square 110 in the normal mode column 102 and the corresponding fourth color indication square 120 in the power saving mode column 112 can be a "catch-all" configuration setting for all other remaining colors not given a corresponding power saving mode color. For example, by selecting an original colors square 122 all other normal mode colors not assigned a power saving mode color can remain their original color during the power saving mode. On the other hand, if a reversed colors square 124 is selected, the other colors not assigned a power saving mode color can be reversed during the power saving mode.

Figure 4:
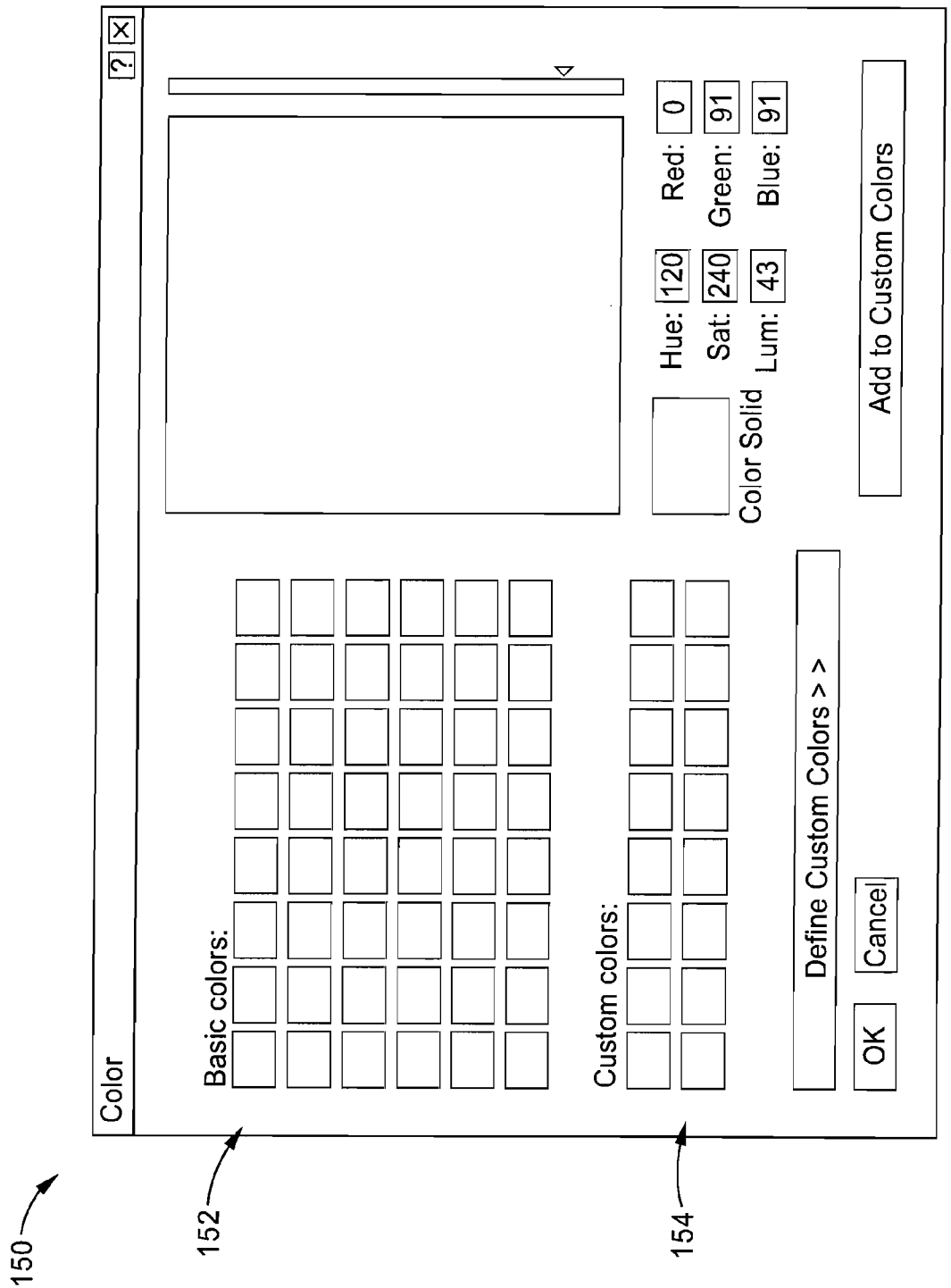
FIG. 4 is a color selection window according to the present invention.

FIG. 4 shows a color selection window, generally designated 150. As shown in FIG. 4, the color selection window 150 includes a basic colors menu 152 and a custom colors menu 154 from which a user can select power saving mode colors as described above.

Figure 5:
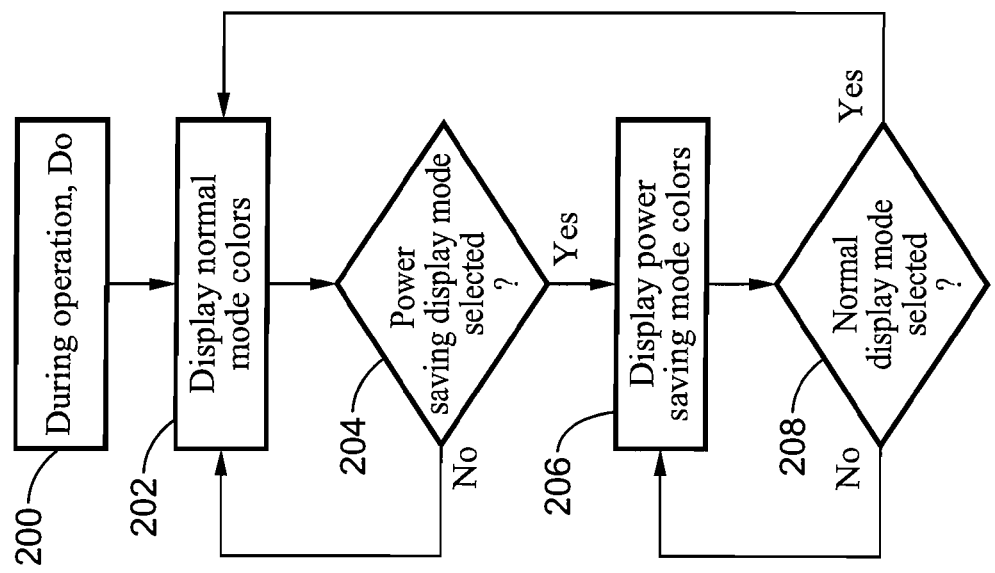
FIG. 5 is a flow chart of the operating logic according to the present invention.

Referring to FIG. 5, a non-limiting, exemplary embodiment of the operating logic according to the present invention is shown and commences at block 200 with a do loop, wherein during operation, the succeeding steps are performed. At block 202, the normal mode colors are displayed at the display 12 (FIG. 1). Next, at decision diamond 204, it is determined whether a power saving display mode is selected. The power saving display mode can be selected manually by a user. Alternatively, the power saving display mode can be selected automatically, e.g., when the power supply 14 (FIG. 1) is switched from AC to DC or if the power level within the power supply 14 (FIG. 1) has fallen below a minimum power threshold.

If the power saving mode is not selected, the logic returns to block 202 and the normal mode colors continue to be displayed by the display 12. Otherwise, if the power saving mode is selected the logic proceeds to block 206 and the power saving mode colors previously selected by a user are displayed. Additionally, the normal mode colors that are not assigned power saving mode colors, are simply reversed or remain their original colors. Thereafter, moving to decision diamond 208, it is determined whether a normal display mode has been selected, e.g., threshold or manually. If so, the logic returns to block 202 and the normal mode colors are again displayed. The logic then continues as described above. If the normal display mode is not selected, the logic returns to block 206 and the power saving mode colors continue to be displayed.

It is to be understood that a graphic memory within the processor usually stores three (Red, Green, Blue) 8-bit data per pixel. The screen on the display 12 is drawn based on the graphics data within the graphic memory. With the system and method described above, a user can select a power saving mode color for one or more normal mode colors. During operation, when a power saving mode is entered, the normal mode colors are switched to their corresponding power saving mode colors. Specifically, each of the pixel data is replaced with a new value based on the color conversion information that a user inputs in the color configuration window 100 (FIG. 3).

Thereafter, when the normal mode is entered, the power saving mode colors revert back to the normal mode colors. Accordingly, a user can effectively choose which normal mode colors are to be switched during power saving mode in order to effectively conserve power while maintaining screen clarity on the display 12 (FIG. 1). It can be appreciated that the power saving display mode can be used in conjunction with displays other than OEL displays. Moreover, the display 12 (FIG. 1) can be used in conjunction with a computer, a cellular telephone, a personal data assistant (PDA), or any other energy-sensitive device that includes a display.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method for conserving power in a controller for an electroluminescent display, comprising:
    providing a plurality of normal mode colors for output on said display;
    providing a plurality of power saving mode colors for output on said display,
    assigning a selected color for each power saving mode color corresponding to one or more normal mode colors; and
    switching each normal mode color having an assigned power saving mode color to the assigned power saving mode color, in response to entering a power saving mode.

2. A method as recited in claim 1, further comprising indicating the reduction in energy consumed by the display when switched to the power saving mode colors.

3. A method as recited in claim 1, wherein the plurality of normal mode colors and the plurality of power saving mode colors, from which a selected color can be assigned for each power saving mode color, are described according to intensity values for each of multiple color components.

4. A method as recited in claim 1, wherein the plurality of normal mode colors and the plurality of power saving mode colors, from which a selected color can be assigned for each power saving mode color, are described according to hue, saturation and luminance components.

5. A method for conserving power in a controller for an electroluminescent display as recited in claim 1, wherein assigning a selected color for each power saving mode color is performed in response to a user selecting a power saving mode color for one or more normal mode colors.

6. A method for conserving power in a controller for an electroluminescent display as recited in claim 5, wherein the user is provided with a menu of power saving mode colors.

7. In an electroluminescent display controller, the improvement comprising:
    providing a plurality of normal mode colors for controller output to a display; and
    providing a plurality of power saving mode colors for controller output to the display;
    assigning a selected color to each of said power saving mode colors corresponding to one or more of said normal mode colors toward saving display power when outputting said power saving mode colors instead of said normal mode colors; and
    switching, by said controller, between a normal display mode in which the normal mode colors are displayed, and a power saving display mode in which the corresponding power saving mode colors are displayed in place of the normal mode colors.

8. An improved electroluminescent display as recited in claim 7, further comprising a power saving indicator configured for showing the reduction in energy consumed by the display when switched to the power saving mode colors from the normal mode colors.

9. An improved electroluminescent display as recited in claim 7, wherein the power saving display mode is entered manually.

10. An improved electroluminescent display as recited in claim 7, wherein the power saving display mode is entered automatically.

11. An improved electroluminescent display controller as recited in claim 7, wherein the display comprises an organic electroluminescent display.

12. An improved electroluminescent display controller as recited in claim 7, wherein assigning a selected color to each of said power saving mode colors is performed in response to a user selecting a power saving mode color for one or more normal mode colors.

13. An improved electroluminescent display controller as recited in claim 12, wherein the user is provided with a menu of power saving mode colors.

14. An apparatus for controlling power consumption of an electroluminescent display, comprising:
 a processor, with associated memory, configured for controlling the operation of an electroluminescent display;
 programming executable on said processor for,
  providing a plurality of normal mode colors for output on said display,
  providing a plurality of power saving mode colors for output on said display,
  assigning a selected color for each power saving mode color corresponding to one or more normal mode colors, and
  switching each normal mode color having an assigned power saving mode color to the assigned power saving mode color, in response to entering a power saving mode.

* * * * *